Feb. 26, 1963

H. A. SCHLIEDER 3,078,713

MEANS FOR GENERATING ELECTRIC FUNCTIONS

Filed Jan. 15, 1959

INVENTOR
Harold A. Schlieder

Feb. 26, 1963    H. A. SCHLIEDER    3,078,713
MEANS FOR GENERATING ELECTRIC FUNCTIONS
Filed Jan. 15, 1959    2 Sheets-Sheet 2

INVENTOR
Harold A. Schlieder
his attorneys

United States Patent Office 3,078,713
Patented Feb. 26, 1963

3,078,713
MEANS FOR GENERATING ELECTRIC FUNCTIONS

Harold A. Schlieder, Syracuse, N.Y., assignor to Blaw-Knox Company, Pittsburgh, Pa., a corporation of Delaware
Filed Jan. 15, 1959, Ser. No. 787,065
9 Claims. (Cl. 73—205)

This invention relates to the generation of electric signals which vary in a fixed pattern with an input signal. More specifically, it relates to apparatus in which a signal is generated which varies as a specific non-linear function of the input signal.

In the operation of control systems and certain types of computers, it is frequently desired that a signal be generated which will have a fixed relationship to an input signal. It may be desired, for example, that an output signal be produced having a specific mathematical relationship to an input signal. Such apparatus is used in performing mathematical operations or otherwise within the computer or control system and is known as a function generator. For example, it may be desired to measure the flow of fluid in a pipe. An input signal may be derived from an instrument responsive to a pressure differential on opposite sides of an orifice or flow nozzle mounted in the pipe. As is well known, the flow varies as the square root of the head or pressure differential. Consequently, a transducer of common form may be employed to generate an electrical input signal proportional to the differential on opposite sides of the orifice. The function generator then generates the square of the input signal with the result that its output is a measure of the flow of fluid in the pipe.

Various types of function generators have been proposed or employed heretofore. Frequently, they have embodied a plurality of vacuum tubes which have produced output signals as a function of the input signal. Other function generators known to me have required a bias voltage and have been quite sensitive to voltage and temperature changes. For example, small fluctuations in the bias voltage of one or more vacuum tubes in a network which embodies them will result in great inaccuracies in the network itself. Further, such networks are sensitive to temperature changes and must be maintained at a constant temperature for accurate operation. The vacuum tubes also require regular maintenance. Other types of function generators have been subject to the same limitations.

I provide a network embodying a plurality of semiconductors and impedances comprising resistors. A semiconductor is a device such as a silicon diode, for example, which is at low voltages, conductive in one direction but not conductive in the opposite direction. Upon reaching a given reverse voltage, the diode will become conductive in the reverse direction. In other words, the diode has an infinite resistance against current flow in one direction until the breakdown voltage is reached. Above the breakdown voltage, the resistance becomes negligible. The breakdown voltage is sometimes known as the Zener breakdown voltage. The effective voltage across the semiconductor thus becomes the difference between the total applied voltage and the Zener voltage. A diode having the above described properties is sometimes known as a p-n junction and is described, for example, in Shockley Patent 2,714,702.

I provide a network comprising a plurality of semiconductors and impedances comprising resistors, so connected to a source of input current to become conductive and non-conductive as the input voltage varies, thereby effectively switching the impedances into and out of the circuit, whereby the current in one part of the circuit varies as a determined function of the input voltage. In my presently preferred embodiment of the invention, I employ silicon junction diodes having Zener breakdown voltages of approximately five volts. Such diodes have been found to be substantially unaffected by variations in ambient temperature. I may also employ resistors generally of substantially equal values to produce a regular and smooth network response.

I preferably couple the network with a magnetic amplifier and feed the network output back to the amplifier opposing the input signal to the amplifier. I preferably place the network in circuit between the amplifier output and the input thereto and arrange the amplifier to balance the feedback from the network and the input signal thereby resulting in an output which is a function of the network and its connections to the amplifier. I preferably employ a magnetic amplifier having virtually infinite gain when no feedback voltage is applied. In other words, the amplifier is one that will, within its capacity, produce the maximum output from the amplifier for any input signal.

In the accompanying drawings, I have illustrated certain present preferred embodiments of my invention in which—

Figure 1:
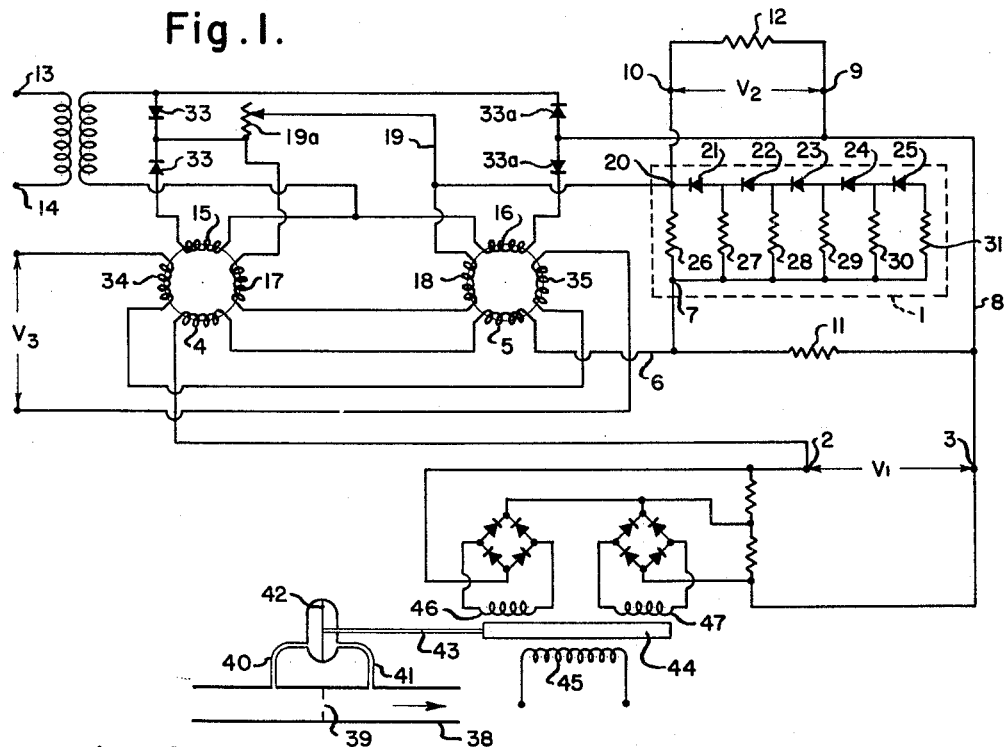
FIGURE 1 is a diagrammatic illustration of a function generator embodying my invention comprising magnetic amplifier and network.

Referring to FIGURE 1, a magnetic amplifier is shown connected to a network indicated generally at 1. An input signal at a voltage $V_1$ is supplied at input terminals 2 and 3. Terminal 2 is connected through magnetic amplifier control coils 4 and 5 then by wire 6 to one terminal 7 of function generator network 1. Terminal 3 connects through wire 8 to output terminal 9, which, with output terminal 10, is connected to an external load 12. A condenser may also be placed across terminals 9 and 10, if desired, to alter the wave form of the magnetic amplifier. Load 12 may, for example, be the input coil of a motor or a valve control mechanism. A voltage $V_2$ is generated across terminals 9 and 10. A feedback resistor 11 is connected between wires 6 and 8. An A.C. power supply is provided at terminals 13 and 14 and is connected through a transformer to magnetic amplifier load coils 15 and 16, feedback coils 17 and 18, and rectifier elements 33 and 33a to output terminals 9 and 10 and to external load 12. Output terminal 10 is also connected to terminal 20 of network 1. Wire 19 provides a shunt around feedback coils 17 and 18. It connects between rectifier elements 33 and terminal 20 through variable resistor 19a, thereby providing a gain control for the magnetic amplifier. Bias coils 34 and 35 are also provided for the magnetic amplifier and are subjected to a voltage $V_3$ which is adjusted for a current to produce the desired number of bias ampere turns.

Figure 2:
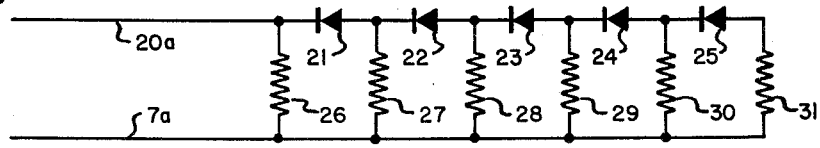
FIGURE 2 illustrates the network shown in FIGURE 1 to somewhat larger scale.

The network 1 illustrated in FIGURE 1 is shown in greater detail in FIGURE 2. A plurality of semiconductors 21, 22, 23, 24, and 25 are connected in series in wire 20a. Silicon junction diodes having a Zener breakdown voltage of five volts were used. A plurality of resistors 26, 27, 28, 29, 30, and 31 are connected between wires 20a and 7a, resistor 26 being connected to wire 7a ahead of semiconductor 21, resistor 27, being connected between semiconductors 21 and 22, resistor 28 being connected between semiconductors 22 and 23, resistor 29 being connected between semiconductors 23 and 24, resistor 30 being connected between semiconductors 24 and 25, and resistor 31 being connected following semiconductor 25. The resistors and associated semiconductors and connecting wires thus form a plurality of branches of the network. A greater or lesser number of semiconductors and resistors than shown may be employed as desired, however. The semiconductors 21, 22, 23, 24, and 25 are arranged opposing flow of a current from wire 20a to wire 7a. While they will freely conduct a current from wire 7a through the resistors to wire 20a, such property is unimportant in the present invention and the sole concern is that each semiconductor will be nonconductive until its Zener breakdown voltage is exceeded by the applied voltage, above which voltage the semiconductor will conduct freely. In other words, each semiconductor will present an infinite resistance to current flowing from wire 20a to wire 7a until the voltage applied to the particular semiconductor exceeds its Zener breakdown voltage, after which it will freely conduct at voltages exceeding the Zener breakdown voltage.

Figure 3:
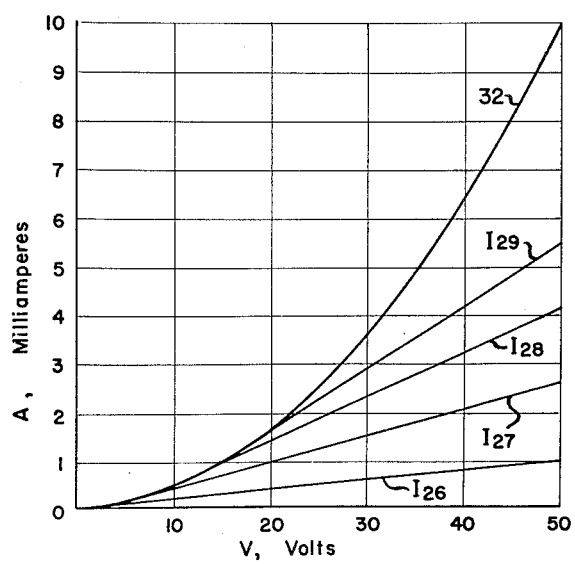
FIGURE 3 is a graph showing the variations in resistance of the network of FIGURE 2 with applied voltage.

FIGURE 3 graphically illustrates the current passing through the network shown in FIGURE 2 for voltages applied across terminals 7 and 20. For proper operation of the function generator comprising the magnetic amplifier and network, it is desired that the current in the network approximate line 32 which is a parabola following the general formula $Y=KX^2$. Parabola 32 is closely approximated by the network current where appropriate Zener voltage and resistance values are chosen for the semiconductors and resistors. The Zener voltage of each of semiconductors 21, 22, 23, 24, and 25 is five volts. By appropriate selection of values for resistors 26, 27, 28, 29, 30 and 31, parabola 32 can be approximated with a high degree of precision. Resistance 26 has a value of approximately 50,000 ohms, and each of the remaining resistors, 27, 28, 29, 30, and 31, has a value of approximately 25,000 ohms. When a voltage is applied across terminals 20 and 7 with terminal 20 being at the higher potential, a current will flow from wire 20a through resistor 26 to wire 7a. The current passing through resistor 26 is indicated by line $I_{26}$ in FIGURE 3. It is to be noted that the numerical values shown in the margins of FIGURE 3 represent the voltage across terminals 20 and 7, and the total current flowing in the wires to and from the rest of the network. When the potential across terminals 20 and 7 reaches five volts, semiconductor 21 will become conductive and will conduct to the extent the applied voltage exceeds five volts, and a second component of current will then flow through resistor 27. Its value will be determined by the difference between five volts, the Zener breakdown voltage of semiconductor 21, and the applied voltage across terminals 20 and 7. The current through resistor 27 will be additive to the component of current flowing in resistor 26 and will increase the total current in the network between terminals 20 and 7. In FIGURE 3 the component of current in resistor 27 is indicated by $I_{27}$ which is shown plotted on $I_{26}$ as a base line. In like manner, when the voltage across terminals 20 and 7 exceeds ten volts, semiconductor 22 will become conductive, and a third component of current, indicated at $I_{28}$ in FIGURE 3, will pass through resistor 28. It will be seen from FIGURE 3 that the cumulative effect of all the components of current through the resistor will form a close approximation of the parabola 32 which it is desired to duplicate. For purposes of clarity, the components of current through the remaining resistors have been omited, but they will continue to be additive in the manner heretofore shown. While the network shown in FIGURE 2 provides an output only to a potential of twenty-five volts across leads 20 and 7, it is clear that the parabola can readily be extended to higher voltages by increasing the number of semiconductors arranged in series in wire 20a and associated resistors, or that if lower voltages are desired, a smaller number of resistors and semiconductors may be used.

The network shown in FIGURE 2 may be slightly modified by eliminating resistor 26 which is the resistor directly across terminals 20 and 7 in advance of all the semiconductors. If the network is so modified, the current will approximate a parabola such as 32, but the values will be shifted somewhat by reason of the omission of current component $I_{26}$ and no current will flow until a potential exceeding the Zener voltage of the first semiconductor is applied. It must be kept in mind that the network only approximates the true mathematical function and that the exact manner and accuracy of approximation will depend upon the detailed design of the network. The detailed design and determination of these matters can readily be made by those skilled in the art, and are not, therefore, discussed further herein.

Figure 5:
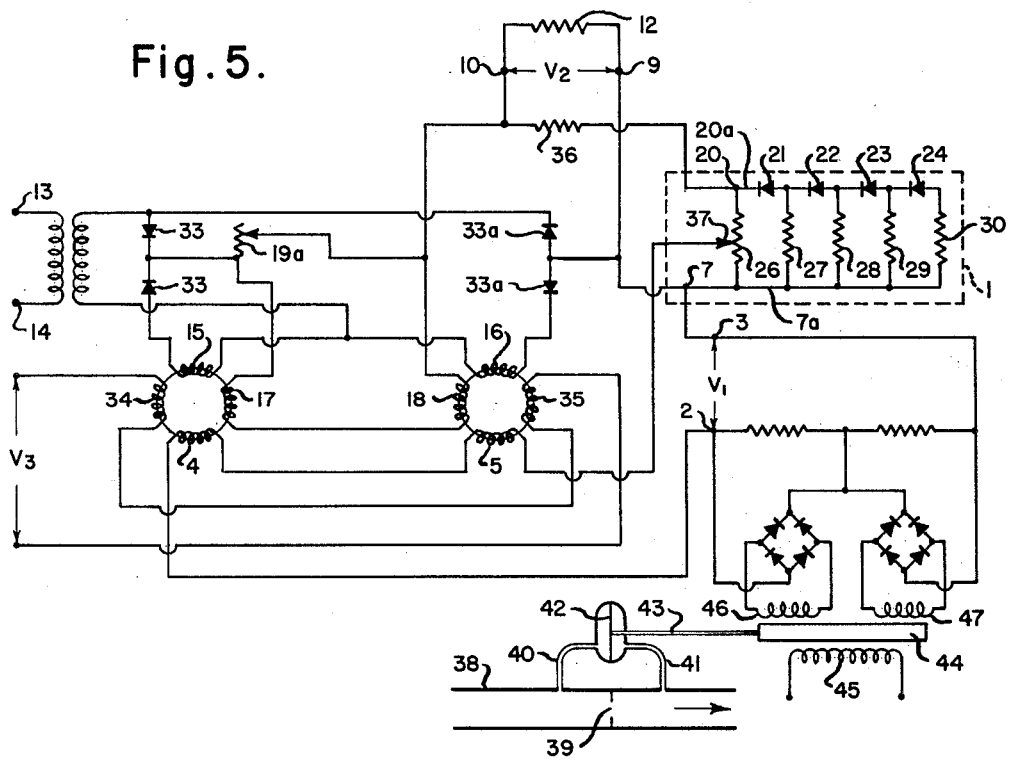
FIGURE 5 illustrates another arrangement of magnetic amplifier and network embodying the invention.

FIGURE 5 illustrates a magnetic amplifier and network similar to that shown in FIGURE 1. The coupling of the amplifier and function generator is revised somewhat, however. In general, like parts have been designated by like numbers as in FIGURE 1. It will be observed, however, that the network is connected between one of the input terminals 3 and control coils 4 and 5. Network terminal 7 is connected to input terminal 3. Control coils 4 and 5 are connected to the network through a variable tap 37 on resistor 26. The variable tap permits the effect of the network and feedback to be modified as desired. A further resistor 36 is placed in circuit between network terminal 20 and output terminal 10, connecting also to feedback coils 17 and 18.

The input to the function generators of FIGURES 1 and 5 is delivered by signal generating means connected to the input terminals 2 and 3. A fluid passing through pipe 38 in the direction indicated by the arrow passes through an orifice 39 resulting in a differential pressure between the two sides of the orifice. The two pressures are carried by pipes 40 and 41 to opposite sides of a flexible diaphragm 42, which is shown diagrammatically. The diaphragm is connected by rod 43 to movable core 44 of a variable transformer having primary winding 45 and secondary windings 46 and 47. The secondary windings are connected in well-known manner through rectifier networks and balancing resistors to input terminals 2 and 3.

Figure 4:
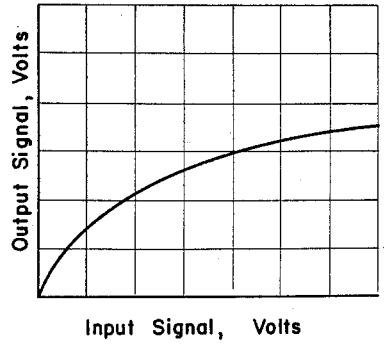
FIGURE 4 is a graph illustrating the function generated by the apparatus shown in FIGURE 1.

Referring now to FIGURE 1, in the operation of the apparatus there shown, the desired bias voltage is applied to bias coils 34 and 35 and power is supplied at terminals 13 and 14. An input signal at a voltage $V_1$ is applied at terminals 2 and 3. This is the control voltage which the apparatus is to match and it is a function of this signal which is to be delivered at terminals 9 and 10. The flow of fluid in pipe 38 causes a differential pressure on opposite sides of orifice 39. The differential pressure is transmitted to diaphragm 42 by pipes 40 and 41 and causes a proportional movement of core 44 of the variable transformer resulting in a D.C. signal being delivered at terminals 2 and 3 which is proportioned to the diagram movement and to the pressure differential across orifice 39. It is well known that the velocity of the fluid and its flow in a pipe are both proportional to the square root of the head-on pressure differential. It other terms, the square of the flow is proportional to the head. Thus the input signal reflects the square of the actual flow of fluid in pipe 38. The input signal is applied to control coils 4 and 5 through resistor 11. Whatever current is passing through control coils 4 and 5 permits a current to pass from the power transformer to output terminals 9 and 10 in accordance with the amplifier characteristics. It will be seen that network 1 is parallel to load resistance 12 and that a portion of the amplifier output will pass through network 1 and resistor 11. This parallel circuit constitutes the feedback and opposes the input signal. When the feedback exactly opposes the input signal, the voltage drop of the feedback current in resistor 11 then equalling the control voltage $V_1$, there will be no current flow in control coils 4 and 5, and the system will come to balance. A change in the input voltage will cause a current flow in the control coils which will then modify the amplifier output until balance is restored at the new input signal. The amplifier output voltage is the sum of the voltages across network 1 and resistor 11. As can be seen from FIGURE 3, the current in the network increases substantially as the square of the voltage applied to the network. Where the resistance of the network is very large relative to that of resistor 11, the total resistance in the feedback circuit may be considered to be identical with the resistance of the network and to vary in the manner shown in FIGURE 3. In some instances, where at high output voltages, the network resistance reduces to a value such that resistor 11 becomes an appreciable amount of the feedback circuit resistance, the value of some of the resistors in network 1 may be reduced slightly to maintain the desired relationship between feedback circuit resistance and output signal voltage. As the input voltage increases, the amplifier output voltage will also increase, resulting in a decrease in the effective resistance of network 1. A greater proportion of the amplifier output voltage will thus be applied as a feedback to the input signal resulting in the output at terminals 9 and 10 increasing less rapidly than the input at terminals 2 and 3. Thus to preserve a balance, the output of the magnetic amplifier will follow and will result in an output signal voltage which varies as the square root of the input signal voltage. This relationship is shown diagrammatically in FIGURE 4.

It is well understood by skilled workers in the art that any suitable load may be connected at output terminals 9 and 10. Very frequently a load having infinite resistance is employed, but a load of any other resistance may be used subject only to the limitation that the load must not require the amplifier to deliver a current beyond its capacity to do so.

The modified form of apparatus shown in FIGURE 5 follows the same principles as those just described. The difference is that the network is interposed in the control signal circuit in place of feedback resistor 11, and a fixed resistor 36 is placed between the amplifier output and the network. In other words, the position of network 1 and fixed resistor 11 of FIGURE 1 have been reversed in FIGURE 5.

Figure 6:
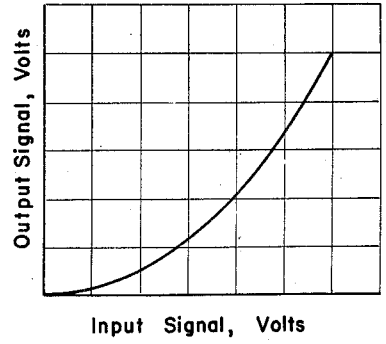
FIGURE 6 is a graph illustrating the function generated by the apparatus shown in FIGURE 5.

The network 1 of FIGURE 5 is similar in all material respects to the network of FIGURE 1. It is supplemented by provision of movable tap 37 on resistor 26. It is apparent that as the input signal increases, the amplifier output will also increase to maintain a balanced condition. With increasing voltages the drop across the network will become a progressively smaller part of the total voltage drop across the network and resistor 36. A lesser proportion of the amplifier output will thus act as a feedback at increasing signal voltages and results in an amplifier output which has an increasing slope as shown schematically in FIGURE 6.

Variable tap 37 may be optionally employed with resistor 26, or it may be rendered ineffective by moving it to the end of resistor 26 nearest terminal 20.

Those skilled in the art will appreciate that the novel network described above is not limited to use with magnetic amplifiers and that it may be otherwise embodied in function generator apparatus. It is likewise apparent that the performance of the network and its particular characteristics may be altered by appropriate selection of components having other values.

While I have illustrated and described certain present preferred embodiments of my invention, it is to be understood that I do not limit myself thereto and that my invention may be otherwise variously practiced within the scope of the following claims.

I claim:

1. In a function generator, a network and means to conduct a varying potential to the network, the network comprising a plurality of semiconductors arranged in series with one terminal of the network opposing flow of the network current to become successively conductive and non-conductive with increases and decreases respectively in the potential, and a plurality of impedances comprising resistors associated therewith and connected between points intermediate the semiconductors and the other network terminal whereby the impedances are switched in and out of the network with changes in the control potential, varying the effective impedance of the network and causing the impedance of the network to vary in a predetermined manner relative to said varying potential.

2. In a function generator, a network comprising a pair of conducting means to receive a varying potential supplied to the network, a plurality of semiconductors connected in series in one of the conducting means and opposing flow of current due to said potential in said conducting means, and a plurality of resistors connected between said conducting means intermediate the semiconductors and the other of said pair of conducting means, whereby the resistors are successively effectively switched into and out of the network with changes in the potential varying the effective resistance of the network in a predetermined manner relative to said potential.

3. Means to generate an electrical signal as a function of an input signal comprising means to receive and amplify a signal, a network connected to the output of said amplifying means and comprising a plurality of series-connected semiconductors arranged to oppose flow of current due to the potential across the network and to become successively conductive and non-conductive with variations in the potential across the network, a plurality of parallel-connected resistors in circuit with the semiconductors thereby becoming effectively switched into and out of the network circuit as the semiconductors become conductive and non-conductive, means connecting the network to the input to the amplifying means with the potential across the network opposing the input to the amplifier thereby establishing the output of the amplifier as a predetermined but non-linear function of the input to the amplifier.

4. Means to generate an electrical output signal which varies as a function of an electrical control signal, said means including an amplifier, a feedback circuit therefor, a network in the feedback circuit having a pair of conductors terminating at terminals, a plurality of semiconductors placed in series in one of said conductors opposing current flow along said conductor in response to a potential applied to the network terminals, and a plurality of resistors extending from one of said conductors to the other of said conductors forming a ladder circuit, connections to said resistors and said semiconductors being arranged alternately in a series with the first and last elements of the series being connections to the resistors.

5. Means to generate an electrical output which varies as a function of an electrical control signal, said means including a ladder network comprising resistors connected across two conductors, said conductors having terminals at one end of the ladder, and a plurality of semiconductors inserted in series in one of the conductors opposing flow of current from the terminal of higher potential, one of said semiconductors being placed in the conductor intermediate each set of adjoining resistor connections to said conductor.

6. A function generator comprising an amplifier and a network having two terminals associated therewith and having the form of a ladder with resistors extending between two conductors and a plurality of semiconductors arranged in series in one of said conductors opposing flow of current, due to a potential applied to said terminals, through said conductor to the resistances, said semiconductors becoming conductive and non-conductive as varying potentials are imposed across the network, the output of the network being fed to the amplifier input to produce an amplified electrical output which varies as a function of the input to the system.

7. A function generator comprising an amplifier, a network associated with the amplifier in the form of a ladder with resistors extending between two conductors, and a plurality of semiconductors placed in series in one of said conductors intermediate the resistor connections thereto to limit current flow through said conductor to the resistors by opposing flow of the current, due to a potential applied to the network, whereby the effective resistance of the network is decreased as the applied voltage is increased, a feedback circuit from the amplifier output to the amplifier input incorporating the network therein and thereby producing an amplified output which increases in a non-linear relationship to the input signal.

8. A function generator comprising an amplifier, a network associated therewith in the form of a ladder with resistors extending between two conductors, a plurality of semiconductors opposing current flow due to a feedback potential applied across the network, said semiconductors being spaced in series in one of said conductors intermediate the resistor connections thereto to limit feedback current flow through said conductor to the resistors, whereby the effective resistance of the network is decreased as the applied voltage is increased, means connecting the amplifier input in series with said network, a feedback circuit comprising the network and a fixed resistance in series, whereby an increased output voltage will cause the feedback circuit voltage drop to increase less rapidly than the feedback output voltage, thereby producing an amplified output which increases more than proportionally to the input signal to the function generator.

9. Apparatus for measuring the flow of fluids in a confined stream comprising in combination means for converting the pressure differential across a section of the fluid stream to an electrical potential proportional to said differential, a magnetic amplifier having a control winding and output terminals, a function-generating network in ladder form comprising a plurality of semiconductors each having substantially the same Zener breakdown voltage serially connected in one leg of the ladder to be successively conductive as the applied voltage increases, a plurality of substantially equal resistance elements connected in parallel across the legs of the ladder, one said resistance being connected beyond each semiconductor, a first resistance connected across the legs of the ladder ahead of the first semiconductor and having substantially twice the resistance of the other resistances, a resistor connected at one side to all said resistances in parallel and at the other side in return current relation to said power source, connections between said output terminals and said function generator network and said resistor in series subjecting said network to the output terminal voltage, and connections between said first mentioned means and said control windings in series across said resistor, whereby the potential of said means is applied as input to said amplifier in voltage-balance relation to a function of the output fed back through said network predetermining an output closely approximating a true measure of the rate of fluid flow.

References Cited in the file of this patent

UNITED STATES PATENTS

| | | |
|---|---|---|
| 1,581,957 | Keller | Apr. 20, 1926 |
| 2,104,336 | Tuttle | Jan. 4, 1938 |
| 2,556,200 | Lesti | June 12, 1951 |
| 2,581,124 | Moe | Jan. 1, 1952 |
| 2,675,510 | Belcher | Apr. 13, 1954 |
| 2,697,201 | Harder | Dec. 14, 1954 |
| 2,769,137 | Creusere | Oct. 30, 1956 |
| 2,801,383 | Comins et al. | July 30, 1957 |
| 2,810,107 | Sauber | Oct. 15, 1957 |
| 2,811,591 | Kennedy | Oct. 29, 1957 |
| 2,842,733 | Lilienstein | July 8, 1958 |
| 2,876,642 | Scorgie | Mar. 10, 1959 |
| 2,906,941 | Brolin | Sept. 29, 1959 |